United States Patent
Shiba

(10) Patent No.: US 9,630,501 B2
(45) Date of Patent: Apr. 25, 2017

(54) VEHICLE

(71) Applicant: TOYOTA JIDOSHA KABUSHIKI KAISHA, Toyota-shi, Aichi-ken (JP)

(72) Inventor: Kenjiro Shiba, Takahama (JP)

(73) Assignee: TOYOTA JIDOSHA KABUSHIKI KAISHA, Aichi-ken (JP)

( * ) Notice: Subject to any disclaimer, the term of this patent is extended or adjusted under 35 U.S.C. 154(b) by 0 days.

(21) Appl. No.: 15/209,114

(22) Filed: Jul. 13, 2016

(65) Prior Publication Data

US 2017/0015199 A1    Jan. 19, 2017

(30) Foreign Application Priority Data

Jul. 16, 2015 (JP) ................................. 2015-142419

(51) Int. Cl.
| | |
|---|---|
| *B60K 1/00* | (2006.01) |
| *B60L 3/00* | (2006.01) |
| *B60R 16/02* | (2006.01) |
| *B60K 6/405* | (2007.10) |

(52) U.S. Cl.
CPC ............ *B60L 3/0007* (2013.01); *B60K 6/405* (2013.01); *B60R 16/0215* (2013.01)

(58) Field of Classification Search
CPC ............... B60R 16/0215; B60L 3/0007; B60Y 2306/01; B60K 2001/0411; B60K 26/00
See application file for complete search history.

(56) References Cited

U.S. PATENT DOCUMENTS

| | | | | |
|---|---|---|---|---|
| 7,766,113 | B2 * | 8/2010 | Yamafuji | B60K 1/00 180/271 |
| 9,073,428 | B2 * | 7/2015 | Shimada | B60K 1/00 |
| 9,199,537 | B2 * | 12/2015 | Hotta | B60K 1/00 |
| 9,205,749 | B2 * | 12/2015 | Sakamoto | B60K 1/00 |
| 2005/0016760 | A1 * | 1/2005 | Vasichek | H02G 3/30 174/135 |
| 2013/0119758 | A1 * | 5/2013 | Takamatsu | B60L 11/1868 307/9.1 |
| 2016/0039308 | A1 * | 2/2016 | Fushimi | B60K 1/00 180/65.31 |

FOREIGN PATENT DOCUMENTS

JP        2013-193634 A        9/2013

* cited by examiner

*Primary Examiner* — Brian Swenson
(74) *Attorney, Agent, or Firm* — Sughrue Mion, PLLC

(57) ABSTRACT

A vehicle includes a motor accommodated in a housing and a power control unit. The power control unit is supported by a front bracket and a rear bracket and fixed above the housing. The rear bracket has a base section, a support section and ribs. The ribs are arranged on both sides of the support section in a vehicle width direction, and each of the ribs has a fragile section. The fragile section is configured to yield first in each of the ribs at a time when the power control unit receives a collision load from a vehicle front direction.

6 Claims, 8 Drawing Sheets

VEHICLE

INCORPORATION BY REFERENCE

The disclosure of Japanese Patent Application No. 2015-142419 filed on Jul. 16, 2015 including the specification, drawings and abstract is incorporated herein by reference in its entirety.

BACKGROUND

1. Technical Field

The disclosure relates to a vehicle in which a motor for traveling (traveling motor) and a power control unit for driving the motor are mounted in a front space of the vehicle.

2. Description of Related Art

Many vehicles that travel by using electric motors are in such a type that the electric motor and a power control unit for driving the motor are mounted in a front space (an engine compartment) of the vehicle. Note that the vehicle in this specification includes, in addition to an electric vehicle, a hybrid vehicle and a fuel cell vehicle. In addition, hereinafter, the "electric motor" will simply be described as the "motor" for simplification of the description. Furthermore, in this specification, according to a custom in a technical field of an automobile, a space for housing a traveling motor is described as the "engine compartment" regardless of whether an engine is actually mounted or not. In particular, in this specification, a motor housing space that is provided in a front section of the vehicle is described as the engine compartment.

The power control unit is typically an inverter that converts DC power of a power supply to AC power. The power control unit possibly includes a booster converter. The power control unit is possibly fixed above a housing that houses the motor. By arranging the power control unit near the motor, a power cable that connects the power control unit and the motor can be shortened, and thus loss in power transmission can be suppressed. One example of a vehicle that has an in-vehicle structure of the power control unit described above is disclosed in Japanese Patent Application Publication No. 2013-193634 (JP 2013-193634 A). In a technique disclosed in JP 2013-193634 A, a front portion and a rear portion of the power control unit are respectively supported by a front bracket and a rear bracket, and the power control unit is fixed with a gap being formed above the housing. A reason for securing the gap between the power control unit and the housing by the front bracket and the rear bracket is to suppress vibrations of the motor transmitted to the power control unit via the housing. Note that, in the following description, the front bracket and the rear bracket may simply be described as the "bracket" for convenience of the description when the front bracket and the rear bracket are not distinguished from each other. When both of the front bracket and the rear bracket are referred, they may be described as "both of the brackets".

Components that handle power of tens of kilowatts exist in the power control unit. The power control unit is desired to be high in collision safety so that a high-voltage circuit therein is not exposed during a collision of the vehicle. In the case where the power control unit is mounted in the engine compartment, the collision safety thereof against a frontal collision (including an oblique collision) is particularly highly desired. The housing of the motor is relatively large and rigid. Thus, arrangement of the power control unit above the housing of the motor is also suited for protection of the power control unit from an obstacle that approaches from the front during the collision. However, even in such a case, there is a possibility that the obstacle passes above the housing during the frontal collision and the obstacle collides with the power control unit. The following disadvantage is present in such a structure that the power control unit is supported via both of the brackets with the gap being formed above the housing in the case where rigidity of each of the brackets is excessively high. More specifically, when the power control unit receives a collision load from the front during the frontal collision, there is a possibility that the load is concentrated on a coupling portion between the bracket and the housing and the coupling portion is damaged. For this reason, the bracket preferably has the strength in such a degree that it is bent when receiving the collision load of a specified magnitude or higher. By the way, in the case where both of the brackets are deformed and collapsed to the rear when the power control unit receives the collision load from the front, the power control unit moves to the rear. In the case where displacement of the power control unit is significant, an excessive tensile force is possibly applied to the power cable, to which a high voltage is applied.

In JP 2013-193634 A, a technique of reducing the tensile force that is applied to the power cable at the time when the power control unit moves to the rear during the collision is also disclosed.

One example of the bracket disclosed in JP 2013-193634 A has the following shape. Ribs that extend in a vertical direction are provided on both sides of the bracket when the bracket is seen from the front of the vehicle. A notch is provided near the center of each of the ribs in an extending direction. When the power control unit receives the collision load from the front, each of the brackets is collapsed to the rear in such a manner that an upper portion thereof above the notch draws an arc with the notch as a center. As a result, even when the brackets are collapsed, a connection distance of the power cable between the power control unit and the housing is retained to a distance that is at most equal to a distance before the collision. Thus, when the power control unit moves during the collision, application of the excessive tensile force to the power cable is prevented.

SUMMARY

In the vehicle in which the traveling motor is mounted, in addition to the power control unit, various electrical devices are mounted in the engine compartment at high mounting density, and electric cables connect between the devices. Accordingly, arrangement of the electric cables including the power cable in the engine compartment is troublesome. In some cases, the electric cable may have to be arranged near the brackets. When the electric cable is involved in the deformation of the brackets during the collision, an excessive load is possibly applied to the electric cable. In the case where the load during the collision is further significant, the bracket is possibly fractured at a position where it is bent, a fractured surface thereof possibly comes in contact with the electric cable nearby, and the electric cable is possibly damaged. This specification provides a technique of protecting the electric cable that runs near the bracket from the deformed or fractured bracket at a time when the bracket is deformed or fractured by the collision load from the front. Note that, as described above, the electric cable may be the power cable that connects the power control unit and the housing, or may be another electric cable.

A vehicle according to this specification includes a motor, a housing, an electric cable, and a power control unit. The motor is for driving the vehicle and is housed in a housing.

The power control unit is configured to drive the motor. The power control unit is mounted in a front space of the vehicle and is supported by a front bracket and a rear bracket. The power control unit is fixed above the housing. The power control unit and the housing define a gap. The rear bracket has a base section, a support section and ribs. The base section is fixed to the housing. The base section has an arch section. The electric cable is arranged between the arch section and the housing, and extends in a vehicle front-rear direction. The support section extends from a front end of the base section to the power control unit. The ribs are arranged on both sides of the support section in a vehicle width direction, and the ribs extend in a vertical direction. Each of the ribs has a fragile section at a position above the arch section. The fragile section is configured to yield first in each of the ribs at a time when the power control unit receives a collision load from a vehicle front direction.

According to the above-described vehicle, when the bracket is deformed or fractured by the collision load from the front, the electric cable that runs near the bracket can be protected from the deformed or fractured bracket.

The fragile section is shorter in length in the vehicle front-rear direction than each of upper and lower portions of each of the ribs. The upper and lower portions are adjacent to the fragile section.

Each of the ribs may have a notch in the fragile section. In addition, each of the ribs may have a through hole in the fragile section. The through hole may be provided across a boundary between each of the ribs and the support section.

The fragile section may be a portion that is thinner than other portions of each of the ribs.

BRIEF DESCRIPTION OF THE DRAWINGS

Features, advantages, and technical and industrial significance of exemplary embodiments will be described below with reference to the accompanying drawings, in which like numerals denote like elements, and wherein.

DETAILED DESCRIPTION OF EMBODIMENTS

Figure 1:
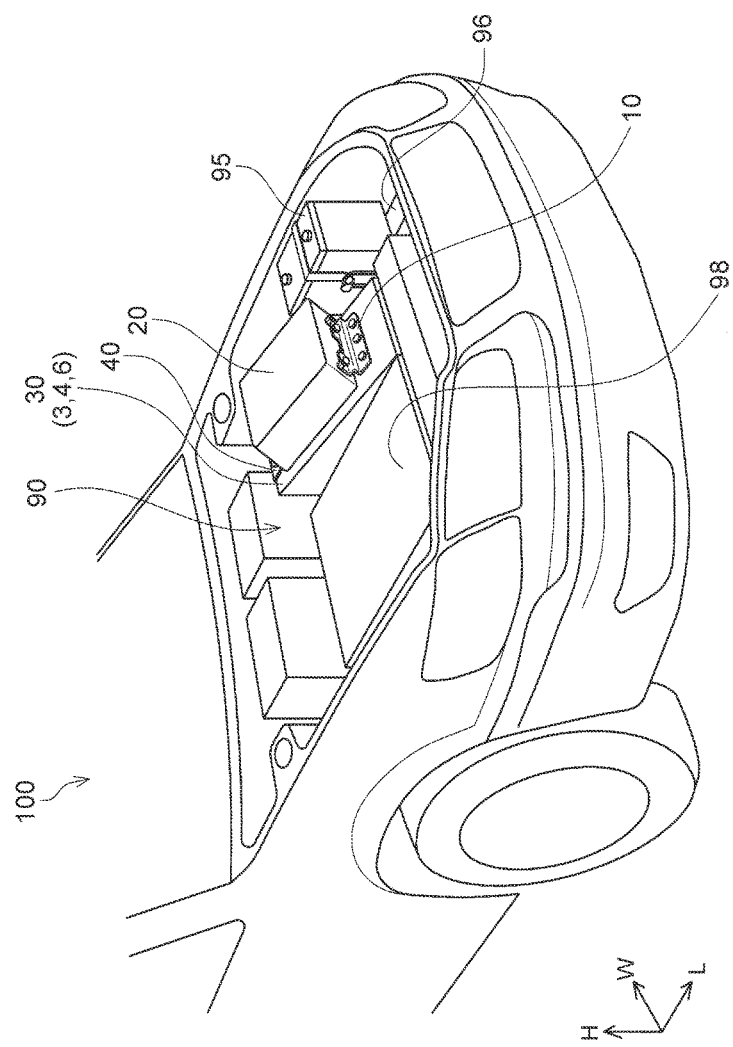
FIG. 1 is a perspective view that shows one example of a component layout of an engine compartment.

A description will be made on a vehicle of an embodiment with reference to the drawings. The vehicle of the embodiment is a hybrid vehicle 100 that includes both of a traveling motor 3 and an engine 98. In the hybrid vehicle 100, the engine 98, the motor 3, and a power control unit 20 for driving the motor 3 are mounted in a front space (an engine compartment 90) of the vehicle. In the engine compartment 90, the power control unit 20 is fixed on a housing 30. The housing 30 houses the motor 3, a power split mechanism 6, and a differential gear 4. For simplification of the description, the "power control unit 20" will hereinafter be abbreviated as a "PCU 20". The PCU stands for the power control unit.

FIG. 1 shows arrangement of a group of devices in the engine compartment 90. The engine 98, the PCU 20, and the housing 30 are mounted in the engine compartment 90, and, in addition to the group of those devices, various devices such as a battery 95 are mounted therein. However, the description of those will not be made. Note that the housing 30, the engine 98, and the like are schematically illustrated in FIG. 1. In a coordinate system in the drawing, an L-axis indicates the front of the vehicle, an H-axis indicates an upper side of the vehicle, and a W-axis indicates a vehicle width direction (sides of the vehicle). The reference numerals of the coordinate system have the same meanings in the following drawings. In addition, in the following description, expressions such as a "front surface", a "rear surface", a "front portion", a "rear portion" will be used for the components that are mounted in the engine compartment. In these expressions, "front" means a vehicle front side, and "rear" means a vehicle rear side.

As described above, in addition to the motor 3, the power split mechanism 6 and the differential gear 4 are housed in the housing 30. The power split mechanism 6 is a gear set that combines/separates output torque of the engine 98 and output torque of the motor 3. Depending on a situation, the power split mechanism 6 splits the output torque of the engine 98 and transmits the split torque to the differential gear 4 and the motor 3. Because the differential gear 4 is embedded, the housing 30 can also be said as a case for the motor and a transaxle. The housing 30 is formed by die casting or grinding aluminum, for example.

The engine 98 and the housing 30 are coupled in such a manner as to be arranged next to each other in the vehicle width direction. The engine 98 and the housing 30 are suspended from a side member 96 that secures structural strength of the vehicle. Although only one unit of the side member 96 is illustrated in FIG. 1, another side member also extends on a lower left side of the engine 98 in FIG. 1. The engine 98 and the housing 30 are suspended between two units of the side members.

The PCU 20 is a device that drives the motor 3. More specifically, the PCU 20 boosts power of a high-voltage battery, which is not shown, then converts the power to AC power, and supplies the AC power to the motor 3. In addition, there is a case where the PCU 20 converts the AC power that is generated by the motor 3 to DC power and lowers a voltage thereof. The power, the voltage of which has been lowered, is stored in the high-voltage battery.

Figure 2:
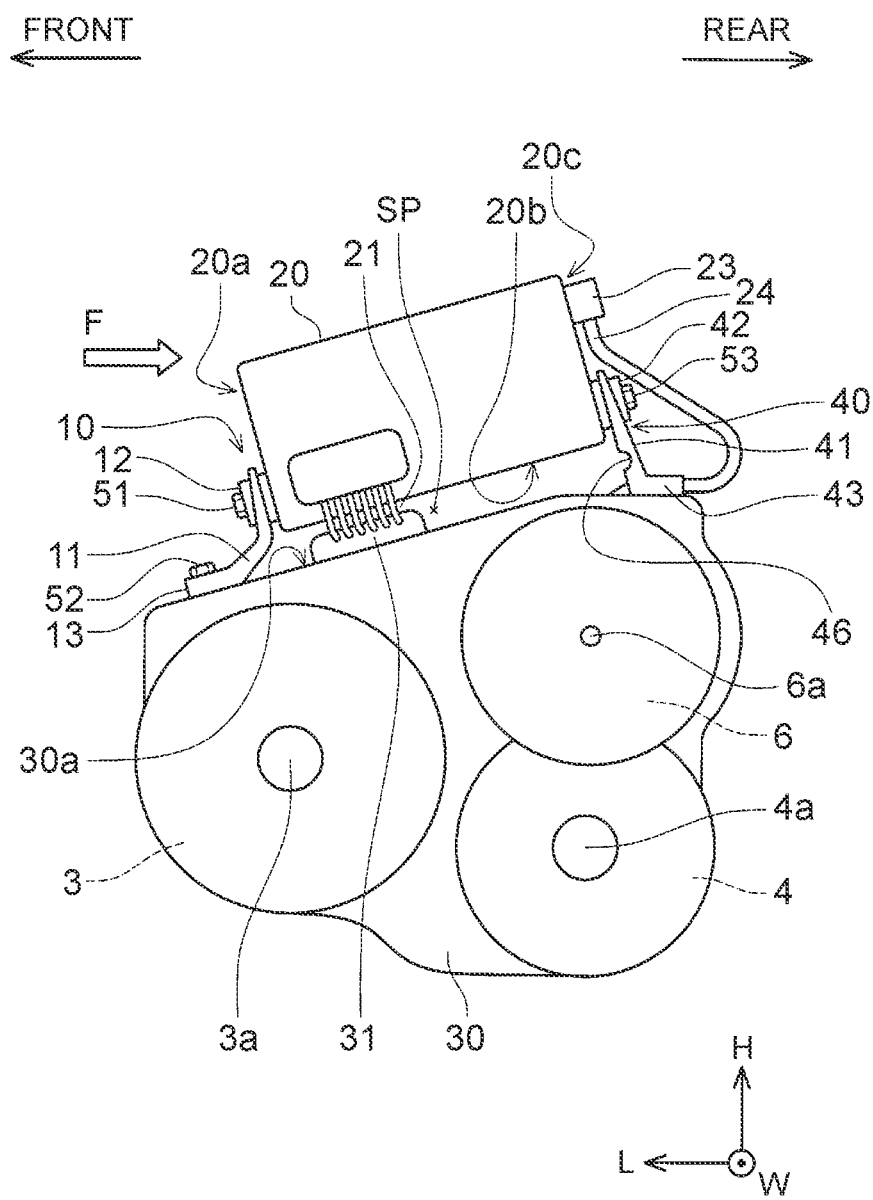
FIG. 2 is a side view of a housing and a PCU (a power control unit)

Although the details will be described below, the PCU 20 is supported with a gap being formed between the PCU 20 and an upper surface of the housing 30. A front side of the PCU 20 is supported by a front bracket 10, and a rear side thereof is supported by a rear bracket 40. A detailed description will be made on a relationship between the housing 30 and the PCU 20 with reference to FIG. 1 and FIG. 2. FIG. 2 is a side view of the PCU 20 and the housing 30. The "side view" is a view that is seen from the vehicle width direction (an H-axis direction in the drawing).

The PCU 20 and the housing 30 are connected by six power cables 21. The power cable 21 is a wire harness for transmitting the power from the PCU 20 to the motor 3. Although it is not described so far, the housing 30 houses two three-phase AC motors, and the six power cables 21 transmit two sets of three-phase AC power. The reference numeral 31 denotes a power cable terminal that is provided on an upper surface 30a of the housing 30. While the two motors are housed in the housing 30, the description will be continued below by focusing on one of the motors (the motor 3).

As described above, the motor 3, the power split mechanism 6, and the differential gear 4 are housed in the housing 30. In the housing 30, an output shaft 3a of the motor 3, a main shaft 6a of the power split mechanism 6, and a main shaft 4a of the differential gear 4 are arranged in parallel. Those three shafts extend in the vehicle width direction. As shown in FIG. 2, the three shafts are arranged to form a triangle when seen from the vehicle width direction. Due to arrangement of the three shafts, the upper surface 30a of the housing 30 descends forward. Thus, the PCU 20 that is supported above the upper surface 30a is also arranged to descend forward.

The PCU 20 is supported above the housing 30 by the front bracket 10 and the rear bracket 40. The front bracket 10 supports a front surface 20a of the PCU 20, and the rear bracket 40 supports a rear surface 20c of the PCU 20. A gap SP is secured between a lower surface 20b of the PCU 20 and the housing 30. This gap SP is secured by the front bracket 10 and the rear bracket 40.

The front bracket 10 includes: a base section 13 that is fixed to the housing 30; and a support section 11 that extends from a rear end of the base section 13 to the PCU 20. As described above, the rear end of the base section 13 of the front bracket 10 means an end on the vehicle rear side of the base section 13 that is fixed onto the housing 30.

The base section 13 of the front bracket 10 is fixed to the upper surface 30a of the housing 30 by bolts 52, and an upper portion of the support section 11 is coupled to the front surface 20a of the PCU 20 by bolts 51. A vibration-proof bush 12 is interposed between the upper portion of the support section 11 and the PCU 20. As shown in FIG. 1, the front bracket 10 is fixed to the housing 30 by the three bolts that are aligned in the vehicle width direction, and is coupled to the PCU 20 by the two other bolts that are aligned in the vehicle width direction. The front bracket 10 is formed with a stamped metal sheet (steel sheet).

The rear bracket 40 includes: a base section 43 that is fixed to the housing 30; and a support section 41 that extends from a front end of the base section 43 to the PCU 20. The front end of the base section 43 means an end on the vehicle front side of the base section 43 that is fixed onto the housing 30.

The reference symbol F schematically represents a collision load that is received by the PCU 20 at a time when the hybrid vehicle 100 is involved in a frontal collision (or an oblique frontal collision). When the PCU 20 receives the significant collision load F from the front, both of the support section 11 of the front bracket 10 and the support section 41 of the rear bracket 40 are bent to the rear. Rigidity of each of the front bracket 10 and the rear bracket 40 is suppressed to such a degree that each of the front bracket 10 and the rear bracket 40 is bent when receiving the collision load F that is at least equal to a specified magnitude. This is because a coupling section between each of the base sections 13, 43 and the housing 30 is damaged when receiving the significant collision load in the case where the rigidity of each of the front bracket 10 and the rear bracket 40 is excessively high. Due to deformation of the front bracket 10 and the rear bracket 40, the load applied to each of the coupling sections is alleviated, and a shock received by the PCU 20 is also alleviated. The detailed description will be made below on the deformation of the rear bracket 40 by the collision load F.

Figure 3:
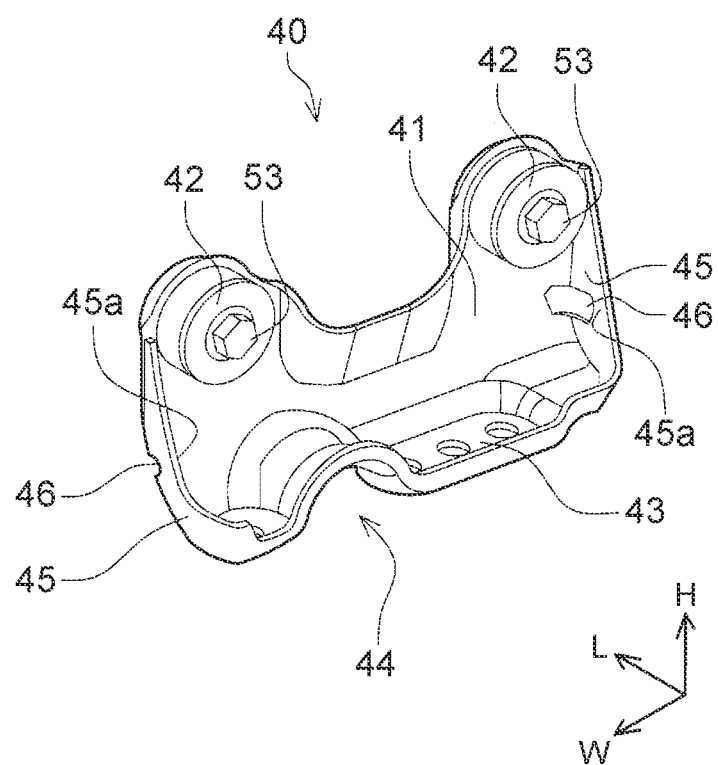
FIG. 3 is a perspective view of a rear bracket.
Figure 4:
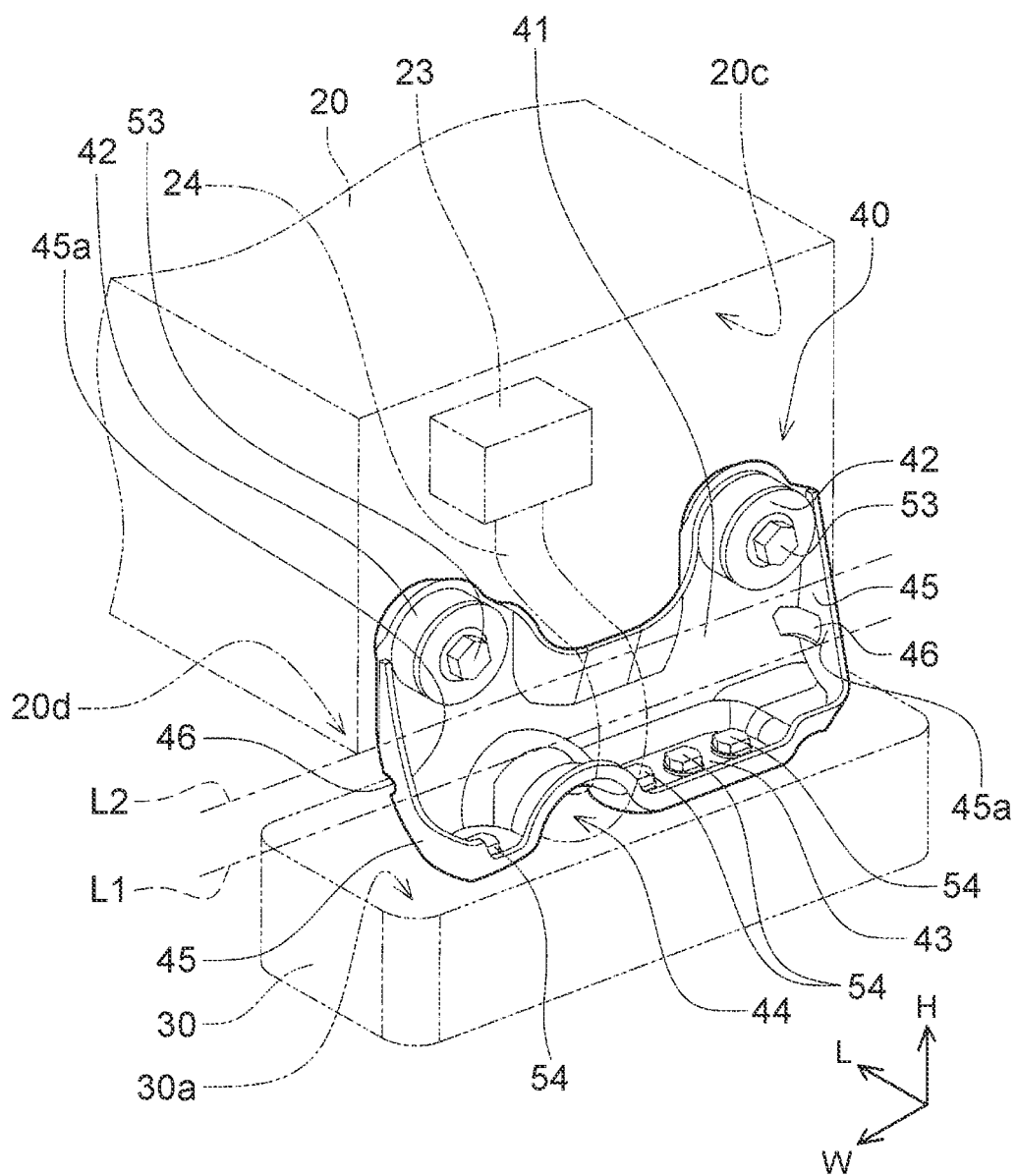
FIG. 4 is a view in which the rear bracket and the PCU are seen obliquely from the rear.

The rear bracket 40 will be described in detail. A perspective view of the rear bracket 40 is shown in FIG. 3. FIG. 4 shows a view in which the PCU 20 and the rear bracket 40 are obliquely seen from the rear. In FIG. 4, in order to foster understanding, the PCU 20 is drawn by virtual lines. In FIG. 4, a portion of the housing 30 that fixes the rear bracket 40 is also drawn by virtual lines. The rear bracket 40 is shaped with a stamped metal sheet. The base section 43 of the rear bracket 40 is fixed to the upper surface 30a of the housing 30 by bolts 54, and an upper portion of the support section 41 is coupled to the rear surface 20c of the PCU 20 by bolts 53. A vibration-proof bush 42 is interposed between the upper portion of the support section 41 and the PCU 20. The rear bracket 40 is fixed to the housing 30 by the four bolts 54 that are aligned in the vehicle width direction, and is coupled to the PCU 20 by the two other bolts that are aligned in the vehicle width direction. The rear bracket 40 is formed with a stamped metal sheet (steel sheet). As described above, the vibration-proof bush 12 is also interposed between the upper portion of the support section 11 of the front bracket 10 and the PCU 20. The PCU 20 is supported with the gap being formed between the PCU 20 and the housing 30, and the vibration-proof bushes 12, 42 are interposed between the brackets 10, 40 and the PCU 20. In this way, motor vibrations that are transmitted to the PCU 20 via the housing 30 are suppressed.

Ribs 45 that extend in a vertical direction along an edge of the support section 41 are provided on both sides of the support section 41 of the rear bracket 40. A lower portion of each of the ribs 45 is curved along an edge of the base section 43. Here, "both of the sides of the support section 41" means both of the sides (that is, ends in the vehicle width direction) of the support section 41 when seen from the front (or the rear) of the vehicle. The ribs 45 are provided to increase the strength of the support section 41 that is formed of the metal sheet. However, as described above, overall strength of the rear bracket 40 is suppressed to such a degree that the support section 41 is bent by the specified collision load.

A through hole 46 is provided generally at the center of each of the ribs 45 in the vertical direction. The through hole 46 is provided in such a manner as to extend to both of the ribs 45 and the support section 41. In other words, the through hole 46 is provided in such a manner as to stretch across a boundary between the ribs 45 and the support section 41. Meanwhile, the base section 43 is provided with an arch section 44 that is curved when seen from the front (or the rear) of the vehicle. The arch section 44 is provided to secure a space that penetrates in a vehicle front-rear direction between a lower surface of the base section 43 and the upper surface 30a of the housing 30.

An electric cable 24 runs between the arch section 44 and the housing 30 (see FIG. 4). That is, the arch section 44 is provided to make the electric cable 24 run in the vehicle front-rear direction between the base section 43 and the housing 30. The electric cable 24 extends from a terminal box 23 that is provided on the rear surface 20c of the PCU 20 and runs below the arch section 44. Then, a tip of the electric cable 24 is connected to an air conditioner, which is not shown. In a case of the hybrid vehicle 100, the air conditioner is operated by the high voltage that is output by the high-voltage battery for driving the traveling motor 3. The power of the high-voltage battery is supplied to the PCU 20, and the terminal box 23 is a relay that branches output of the high-voltage battery. High-voltage power is supplied from the relay (the terminal box 23) to the air conditioner via the electric cable 24. Because the high-voltage power flows through the electric cable 24, it is desired to be able to avoid damage to the electric cable 24 during the collision of the vehicle. A purpose is to avoid exposure of a high-voltage conductor in the electric cable 24.

Various electric devices are mounted at high density in the engine compartment, and the electric devices are connected by the electric cables. Accordingly, the electric cables possibly run through various locations in the engine compartment. Depending on a case, the electric cable may have to be arranged near the rear bracket 40 that supports the PCU 20. The electric cable 24 is such an example. The electric cable 24 runs below the arch section 44. Meanwhile, as described above, the support section 41 of the rear bracket 40 is bent to the rear when the vehicle is involved in the frontal collision (or the oblique frontal collision). When the electric cable 24 is influenced by the bending deformation of the support section 41, the excessive load is possibly applied to the electric cable 24. Depending on a case, the upper portion of the support section 41 is possibly fractured. A fractured surface of the support section 41 is sharp. Thus, in the case where the electric cable 24 comes in contact with this fractured surface, the electric cable 24 is possibly damaged. The arch section 44, through which the electric cable 24 runs, is provided to protect the electric cable 24 from the deformed or fractured support section 41.

Figure 5:
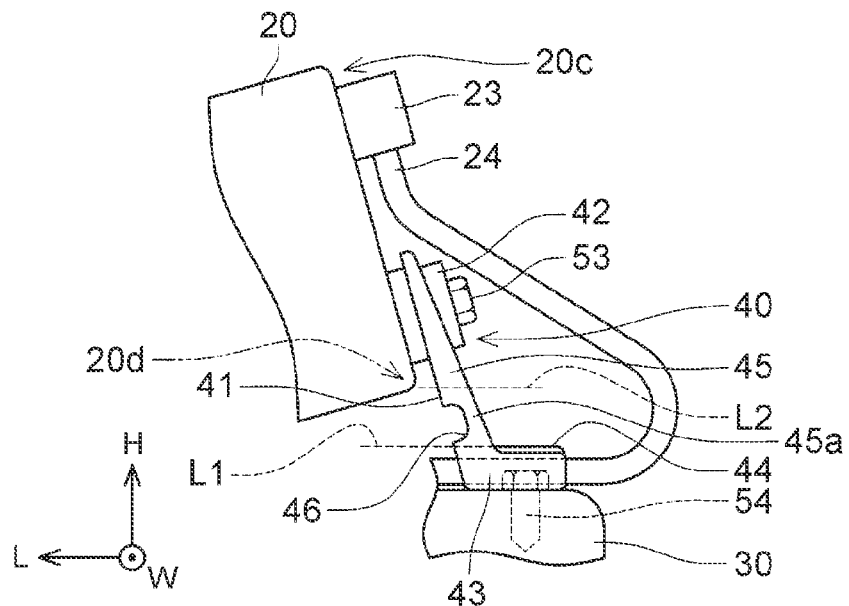
FIG. 5 is an enlarged side view of vicinity of the rear bracket.
Figure 6:
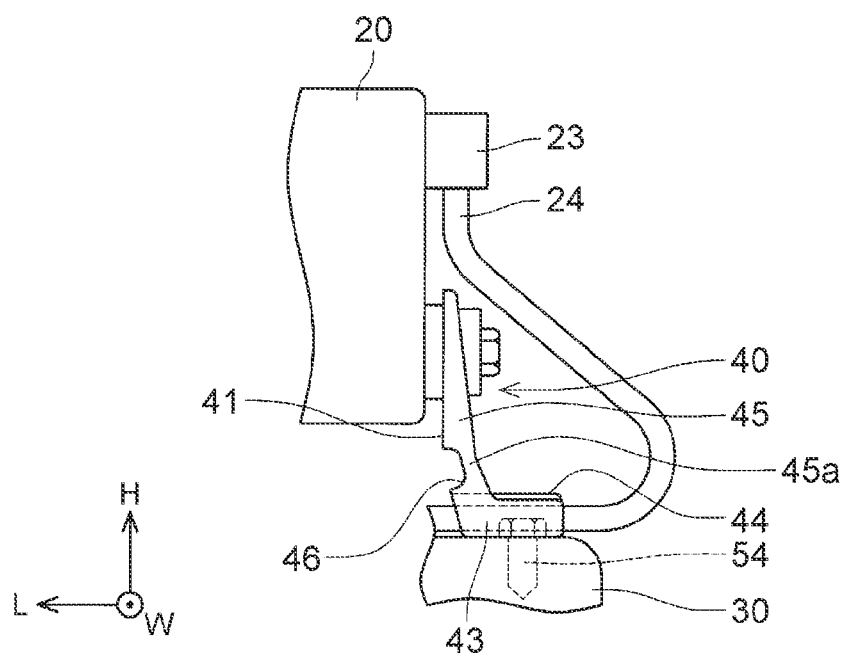
FIG. 6 is an enlarged side view of the vicinity of the rear bracket that has been deformed.
Figure 7:
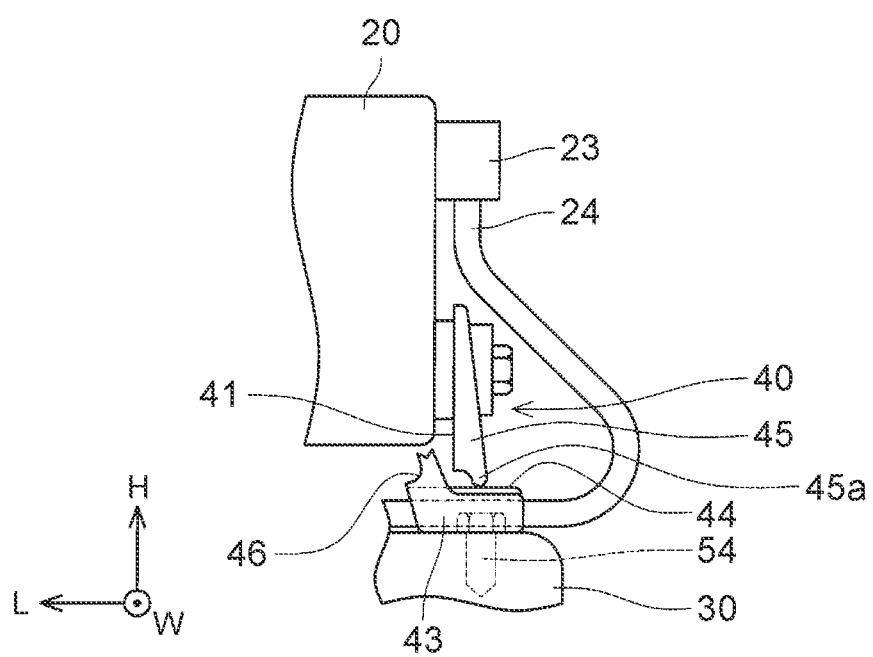
FIG. 7 is an enlarged side view of the vicinity of the rear bracket that has been fractured.

Next, a description will be made on a relationship among the deformation/fracture of the rear bracket during the collision, the through hole 46, and the arch section 44. The description will hereinafter be continued with reference to FIG. 5 to FIG. 7 in addition to FIG. 4. FIG. 5 is an enlarged side view of vicinity of the rear bracket. FIG. 6 is an enlarged side view of the support section 41 that has been deformed by receiving the collision load. FIG. 7 is an enlarged side view of the support section 41 that has been fractured by receiving the further significant collision load. The through holes 46 on both of the sides of the support section 41 are provided above the arch section 44. A broken line L1 shown in FIG. 4 and FIG. 5 represents a linear line that passes through an upper end of the arch section 44. The through holes 46 are provided above the broken line L1. In addition, a broken line L2 in FIG. 4 and FIG. 5 represents a linear line that passes through a lower rear end 20d of the PCU 20. The through holes 46 are provided below the broken line L2, that is, the lower rear end 20d of the PCU 20.

A rear side of each of the ribs 45 from the through hole 46 is referred to as a low rib section 45a. Rib width of the low rib section 45a is smaller than rib width of a portion on an upper side and rib width of a portion on a lower side of the low rib section 45a. Here, the rib width means length in a short direction of the rib 45 when the rib 45 is seen from the vehicle width direction. As the rib width is increased, the rear bracket 40 is less likely to be bent to the rear. When the PCU 20 receives the collision load from the front, stress is concentrated on the low rib section 45a. Accordingly, when the collision load is received, the low rib section 45a of the rib 45 yields first. Thus, the support section 41 is bent to the rear generally at a linear line that connects the through holes 46 on both of the sides (see FIG. 6). Here, a condition that the low rib section 45a yields first in the rib 45 is that the stress generated on the low rib section 45a by the collision load exceeds yield stress of the rib 45. A magnitude of the yield stress is defined by a material of the rib. Stress generated at each location in the rib 45 can be computed from a simulation. Based on the simulation, a shape of the low rib section 45a that satisfies the above condition, that is, a shape of the through hole 46 can be defined.

In addition, because the through holes 46 are provided above the arch section 44, a bending boundary never reaches the arch section 44 (see FIG. 6). In particular, as shown in FIG. 4, each of the through holes 46 is provided across a boundary between the rib 45 and the support section 41 and forms a notch at the boundary between the support section 41 and the rib 45. Although not shown in FIG. 4, the through hole 46 on a left side in the drawing has the same shape as the through hole 46 on a right side and forms the notch in the support section 41. When seen from the front of the vehicle, the support section 41 has the notches on both of the sides. When the collision load from the front is received, the low rib section 45a of each of the ribs 45 yields first. In the vicinity thereof, the support section 41 is provided with the notches on both of the sides. Accordingly, the support section 41 is likely to be bent to the rear along a line that connects between the notches (the through holes 46) on both of the sides. The through holes 46, each of which is provided across the boundary between the rib 45 and the support section 41, contribute to the deformation of the support section 41 that reliably occurs at a position above the arch section 44.

When the collision load is significant, the support section 41 is possibly fractured at the bending boundary. The fractured surface at a lower end of the fractured support section 41 is sharp, and thus the electric cable that comes in contact with the fractured surface is possibly damaged. A fragment of the support section 41 that has the fractured surface at the lower end falls on the arch section 44. The high-voltage electric cable 24 is protected by the arch section 44 from above. Thus, the arch section 44 protects the electric cable 24 from the falling fragment of the support section 41 (see FIG. 7). An arch shape provides high strength, and thus can sufficiently withstand the fragment of the support section 41 that falls from above.

Figure 8:
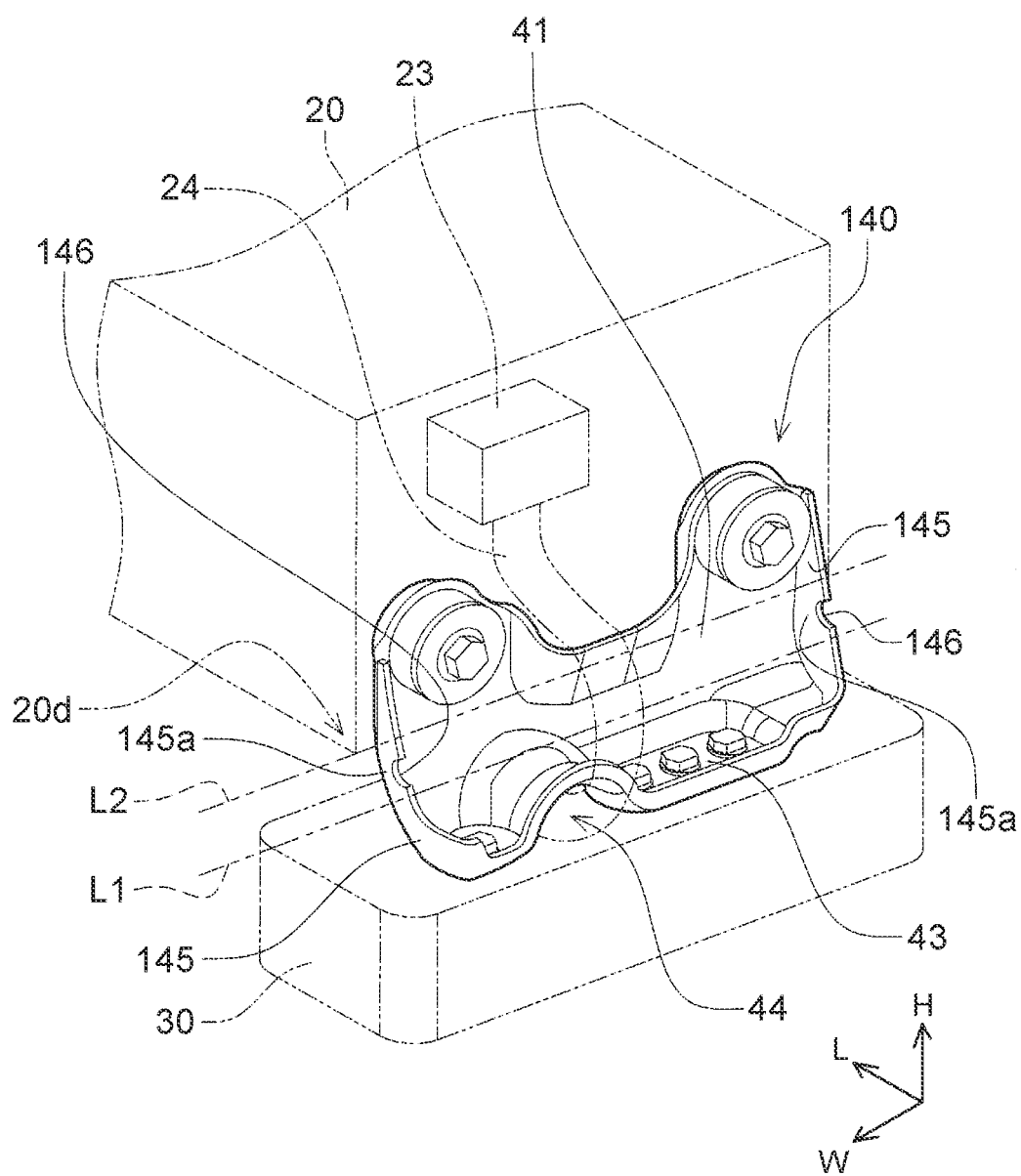
FIG. 8 is a view that shows a first modified example of the rear bracket.

FIG. 8 is a perspective view of a rear bracket 140 of a first modified example. A shape of the entire rear bracket 140 is the same as that of the above rear bracket 40 (see FIG. 4). The rear bracket 140 differs from the rear bracket 40 in a point of having notches 146 instead of the through holes 46. The rear bracket 140 includes: the base section 43 that is fixed to the housing 30; and the support section 41 that extends from the front end of the base section 43 to the PCU 20. The base section 43 thereof includes the arch section 44, through which the electric cable 24 runs in the vehicle front-rear direction between the base section 43 and the housing 30. Ribs 145 that extend in the vertical direction are provided on both of the sides of the support section 41 when seen from the front. In both of the ribs 145, the notches 146 are provided above the arch section 44. A low rib section 145a that has smaller rib width than portions on upper and lower sides thereof is formed in front of the notch 146. The low rib section 145a is provided above the arch section 44 and below the lower rear end 20d of the PCU 20. In FIG. 8, the broken line L1 represents a linear line that passes above the arch section 44, and the broken line L2 represents a linear line that passes through the lower rear end 20d of the PCU 20. The notch 146 and the low rib section 145a are provided in a range between the broken lines L1, L2. A shape of the low rib section 145a (that is, a shape of the notch 146) is defined such that the low rib section 145a yields first in the rib 145 when the PCU 20 receives the collision load from the front.

Figure 9:
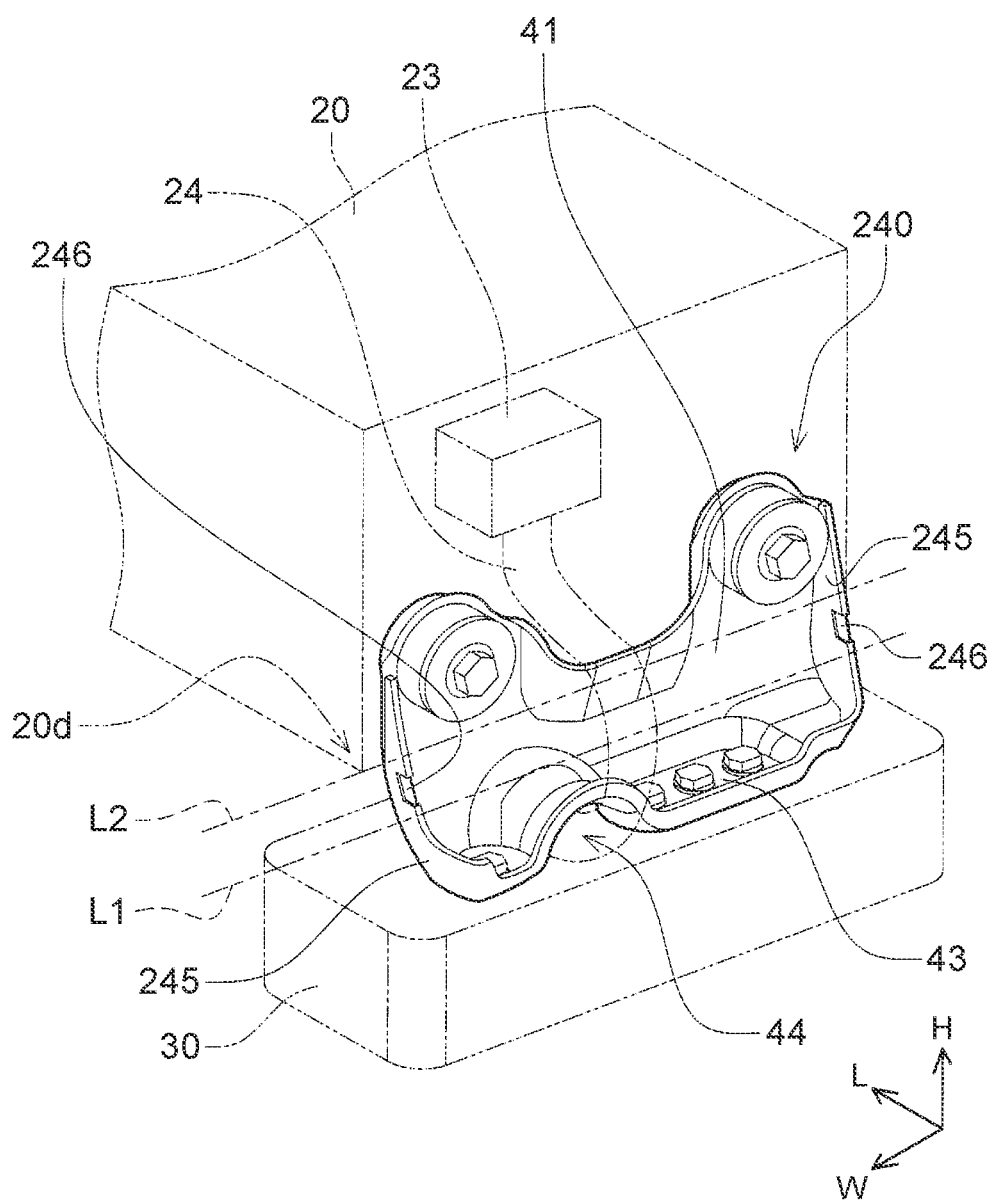
FIG. 9 is a view that shows a second modified example of the rear bracket.

FIG. 9 is a perspective view of a rear bracket 240 of a second modified example. A shape of the entire rear bracket 240 is the same as that of the above rear bracket 40 (see FIG. 4). The rear bracket 240 differs from the rear bracket 40 in a point of having thin sections 246 instead of the through holes 46. The rear bracket 240 includes: the base section 43 that is fixed to the housing 30; and the support section 41 that extends from the front end of the base section 43 to the PCU 20. The base section 43 thereof includes the arch section 44, through which the electric cable 24 runs in the vehicle front-rear direction between the base section 43 and the housing 30. Ribs 245 that extend in the vertical direction are provided on both of the sides of the support section 41 when seen from the front. In both of the ribs 245, the thin sections 246 that are thinner than other portions of the ribs 245 are provided above the arch section 44. Each of the thin sections 246 is provided above the arch section 44 and below the lower rear end 20d of the PCU 20. In FIG. 9, the broken line L1 represents a linear line that passes above the arch section 44, and the broken line L2 represents a linear line that passes through the lower rear end 20d of the PCU 20. The thin sections 246 are provided in the range between the broken lines L1, L2. A shape (that is, size and thickness) of the thin section 246 is defined such that the thin section 246 yields first in the rib 245 when the PCU 20 receives the collision load from the front.

The rear bracket 140 in FIG. 8 and the rear bracket 240 in FIG. 9 have the same advantages as the above rear bracket 40. However, the rear bracket 40 differs from the other rear brackets 140, 240 in a point that, in positions of the through holes 46, rear ends of the ribs 45 (portions farthest from the support section 41) continue steadily. The "rear end of the rib 45" means an end of the rib 45 on the vehicle rear side. The above shape of the rear bracket 40 contributes to the increased rigidity of the entire rear bracket 40 to be higher than rigidity of each of the other rear brackets 140, 240. In the case where the rigidity of the rear bracket 40 is high, vibrations of the motor 3 that are transmitted to the PCU 20 through the housing 30 are suppressed.

Points of attention in the technique described in the embodiment will be described. The low rib section 45a at the rear of the through hole 46 in the rear bracket 40, the low rib section 145a in front of the notch 146 in the rear bracket 140, and the thin section 246 in the rear bracket 240 are each one example of a "fragile section". The PCU 20 is one example of the power control unit.

In the embodiment, the technique of the subject application has been explained by using the hybrid vehicle 100 as the example. The technique disclosed in this specification is suitable to be applied to an electric vehicle and a fuel cell vehicle. In a case of the fuel cell vehicle, the power control unit is a device that drives the traveling motor by using the power generated by a fuel cell.

In the vehicle of the embodiment, the rear bracket is coupled to the rear surface of the PCU. However, the rear bracket may be coupled to a bottom surface or a front section of a side surface of the PCU.

In the vehicle as a target of the technique disclosed in this specification, the traveling motor and the power control unit that drives the motor are mounted in the front space (the engine compartment) of the vehicle. A front portion and a rear portion of the power control unit are respectively supported by the front bracket and the rear bracket, and the power control unit is fixed above the housing of the motor with the gap being formed therebetween. Here, the technique disclosed in this specification adopts such a structure that the rear bracket includes: the base section that is fixed to the housing; and the support section that extends from the front end of the base section to the power control unit. In addition, the base section that is located at the rear of the support section is provided with the arch section, through which the electric cable runs in the vehicle front-rear direction between the base section and the housing. Furthermore, the ribs that extend in the vertical direction are provided on both of the sides of the support section when seen from the front. In each of the ribs, the fragile section that yields first in the rib at the time when the power control unit receives the collision load from the front is provided above the arch section.

Note that "yield" is a technical term in structural mechanics and means that deformation of a member that receives a force is shifted from elastic deformation to plastic deformation. In addition, in this specification, "front" means the vehicle front side, and "rear" means the vehicle rear side. Accordingly, "forward" means the vehicle front side, and "rearward" means the vehicle rear side. Furthermore, the "vehicle front-rear direction" means a direction that connects the vehicle front side and the vehicle rear side. Moreover, the "front end of the base section" means an end of the base section on the vehicle front side.

According to the above structure, when the collision load from the front is received, the fragile section yields first in the rib, and a portion above the fragile section is collapsed to the rear, that is, above the base section. At this time, the support section is bent to the rear at a line that connects both of the fragile sections. Because the line that connects the fragile sections is located above the arch section, a bent portion never reaches the arch section. That is, the electric cable below the arch section is prevented from being involved in the deformation of the bracket. Furthermore, in the case where the collision load is significant, the support section is possibly fractured at the bent portion. When a portion of the support section is fractured, the fragment of the support section that has the fractured surface at the lower end falls on the base section. The arch shape provides the high structural strength, and thus a possibility of being crushed is low even when the fragment of the support section falls from above. The arch section protects the electric cable from the fragment of the support section. The technique disclosed in this specification protects the electric cable from the deformed/fractured rear bracket by providing the arch section, through which the electric cable runs, in the base section of the rear bracket and by providing the fragile section in the portion above the arch section of the support section.

One type of the fragile section may be a portion in which the length of the rib in the short direction, which is seen from the vehicle width direction, becomes shorter than those of the portions on upper and lower sides of the notch or the through hole due to the notch or the through hole provided in the rib. The length of the rib in the short direction, which is seen from the vehicle width direction, will hereinafter be described as the rib width. In addition, another type of the fragile section may be a portion (a thin section) that is thinner than the other portions of the rib. Here, in the case where the notch or the thin section is provided in the rib, the rigidity of the entire bracket is degraded in comparison with the case where the through hole is provided. In the case where the rigidity of the bracket is degraded, the vibrations of the motor are more likely to be transmitted to the power control unit through the housing. Accordingly, the fragile section is preferably the portion that has the smaller rib width than the portions on the upper and lower sides of the through hole due to the through hole provided in the rib. Furthermore, the through hole is preferably provided across the boundary between the rib and the support section. Regarding the through holes, by providing the notches on both of the sides of the support section, a possibility that the support section is bent at the line for connecting the through holes on both of the sides is increased. That is, a possibility that the deformation of the support section influences the arch section can be lowered. By providing the through holes across the boundaries of the ribs and the support section, two advantages can simultaneously be obtained, the advantages being that degradation of the rigidity of the entire bracket is suppressed and that the support section is reliably bent at the line that connects the through holes on both of the sides.

Here, the embodiment will be summarized. The housing 30 and the PCU 20 that drives the motor are mounted in the front space of the vehicle. The front and rear portions of the PCU 20 are respectively supported by the front bracket 10 and the rear bracket 40. The rear bracket 40 includes: the base section 43 that is fixed to the housing 30; and the support section 41 that extends from the front end of the base section 43 to the PCU 20. The base section 43 includes the arch section 44, through which the electric cable 24 runs in the vehicle front-rear direction between the base section 43 and the housing 30. The ribs 45 that extend in the vertical direction are provided on both of the sides of the support section 41 when seen from the front. In both of the ribs 45, fragile sections 45a that yield first in the ribs 45 at the time when receiving the collision load from the front are provided above the arch section 44.

The specific embodiment has been described in detail so far. However, this is merely illustrative and the technique described in the specification includes various modifications and changes that are made to the specific embodiment illustrated above. Technical elements that are described in this specification and the drawings demonstrate technical utility when used singly or in various combinations.

What is claimed is:

1. A vehicle comprising:
    a motor for driving the vehicle,
    a housing that accommodates the motor;
    an electric cable; and
    a power control unit configured to drive the motor, the power control unit mounted in a front space of the vehicle, the power control unit supported by a front bracket and a rear bracket, the power control unit fixed above the housing, the power control unit and the housing defining a gap, and the rear bracket having:
        a base section fixed to the housing, the base section having an arch section, the electric cable being arranged between the arch section and the housing, and the electric cable extending in a vehicle front-rear direction;
    a support section extending from a front end of the base section to the power control unit; and
    ribs being arranged on both sides of the support section in a vehicle width direction, the ribs extending in a vertical direction, each of the ribs having a fragile section at a position above the arch section, and the fragile section being configured to yield first in each of the ribs at a time when the power control unit receives a collision load from a vehicle front direction.

2. The vehicle according to claim 1, wherein
    the fragile section is shorter in length in the vehicle front-rear direction than each of an upper portion and a lower portion of each of the ribs, the upper portion and the lower portion being adjacent to the fragile section.

3. The vehicle according to claim 1, wherein
    each of the ribs has a notch in the fragile section.

4. The vehicle according to claim 1, wherein
    each of the ribs has a through hole in the fragile section.

5. The vehicle according to claim 4, wherein
    the through hole is provided across a boundary between each of the ribs and the support section.

6. The vehicle according to claim 1, wherein
    the fragile section is a portion that is thinner than other portions of each of the ribs.

* * * * *